United States Patent
O'Neil et al.

(10) Patent No.: US 12,299,173 B2
(45) Date of Patent: May 13, 2025

(54) SYSTEMS AND METHODS FOR ANALYZING ALGORITHMS OR OTHER PROCESSES

(71) Applicant: O'Neil Risk Consulting & Algorithmic Auditing, Brooklyn, NY (US)

(72) Inventors: Catherine O'Neil, Cambridge, MA (US); Elizabeth O'Neil, Cambridge, MA (US); Meredith Broussard, New York, NY (US); Jacob Appel, Los Angeles, CA (US); Thomas Adams, Brooklyn, NY (US); Isaac Robinson, Milton, MA (US)

(73) Assignee: O'Neil Risk Consulting & Algorithmic Auditing, Brooklyn, NY (US)

( * ) Notice: Subject to any disclaimer, the term of this patent is extended or adjusted under 35 U.S.C. 154(b) by 275 days.

(21) Appl. No.: 17/804,018

(22) Filed: May 25, 2022

(65) Prior Publication Data
US 2023/0385448 A1  Nov. 30, 2023

(51) Int. Cl.
*G06F 21/62* (2013.01)

(52) U.S. Cl.
CPC ................ *G06F 21/6254* (2013.01)

(58) Field of Classification Search
CPC .................................................. G06F 21/6254
USPC .......................................................... 726/26
See application file for complete search history.

(56) References Cited

U.S. PATENT DOCUMENTS

| | | | | |
|---|---|---|---|---|
| 10,412,097 | B1* | 9/2019 | Banshats | H04L 63/083 |
| 11,645,650 | B1* | 5/2023 | Singh | H04L 9/0637 |
| | | | | 705/75 |
| 2016/0086222 | A1* | 3/2016 | Kurapati | G06Q 40/08 |
| | | | | 705/14.53 |
| 2018/0232536 | A1* | 8/2018 | Fineman | G06Q 30/0201 |
| 2022/0351068 | A1* | 11/2022 | Mishraky | G06N 20/00 |
| 2023/0127927 | A1* | 4/2023 | Chen | G06F 21/6245 |
| | | | | 726/26 |

OTHER PUBLICATIONS

McCarthy, Dan, "To regulate AI, try playing in a sandbox," Tech Brew, published on May 26, 2021, retrieved from https://www.emergingtechbrew.com/stories/2021/05/26/regulate-ai-just-play-sandbox (8 pages).
The Economist, "How to make computers less biased," YouTube, published on Feb. 10, 2022, retrieved from https://www.youtube.com/watch?v=IzvgEs1wPFQ (2 pages).

* cited by examiner

*Primary Examiner* — Moeen Khan
(74) *Attorney, Agent, or Firm* — Bookoff McAndrews, PLLC (57) ABSTRACT

A computer-implemented method for processing data may comprise receiving, from a user, a first data set including at least one item of personally identifiable information ("PII") for a plurality of individuals, wherein the first data set includes information related to an outcome of an algorithm or process; analyzing the received first data set to infer at least one trait of the plurality of individuals; storing a second data set in a data store, wherein the second data set includes the at least one trait, and wherein the second data set does not include the at least one item of PII; analyzing the second data set to determine a fairness of the algorithm or process; and providing a report to the user related to the determined fairness of the algorithm or process.

15 Claims, 5 Drawing Sheets

SYSTEMS AND METHODS FOR ANALYZING ALGORITHMS OR OTHER PROCESSES

TECHNICAL FIELD

Various aspects of this disclosure relate generally to electronic systems and methods for analyzing algorithms or other processes and, more specifically, to systems and methods for analyzing an algorithm or other process to determine statistical outcomes for the algorithm, including bias, sensitivity, and/or disparate impact outcomes, each of which may be indicative of fairness or lack of fairness.

BACKGROUND

Entities may utilize algorithms in evaluating individuals or other entities. For example, an entity may utilize an algorithm to analyze an individual, such as an applicant, to determine whether to offer or decline employment, credit, insurance, housing, government benefits, admission, or other goods or services. The entity and third parties, such as regulators, may desire to understand whether the entity is considering individuals in a fair or biased manner. For example, the entity and/or the third parties may desire to know whether the algorithm favors individuals with certain characteristics. However, existing techniques may require customized analysis of data and/or handling of sensitive data (e.g., personally identifiable information ("PII") or demographic information). Therefore, a need exists for systems and methods for analyzing an algorithm or other process for fairness or bias, sensitivity, and/or disparate impact.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for analyzing bias.

A computer-implemented method for processing data may comprise: receiving, from a user, a first data set including at least one item of personally identifiable information ("PII") for a plurality of individuals, wherein the first data set includes information related to an outcome of an algorithm or process; analyzing the received first data set to infer at least one trait of the plurality of individuals; storing a second data set in a data store, wherein the second data set includes the at least one trait, and wherein the second data set does not include the at least one item of PII; analyzing the second data set to determine a fairness of the algorithm or process; and providing a report to the user related to the determined fairness of the algorithm or process.

Any of the example methods herein may include any of the following steps or features. The method may include analyzing the received first data set is performed in a secure computing environment. The secure computing environment may operate for a discrete amount of time after receiving a request from a user computing device. The report may be configured so as to prevent the user from associating the inferred at least one trait with any one of the plurality of individuals. The at least one trait may include a protected class status. The method may include receiving, from the user, a selection of a trait to infer, and wherein the analyzing the received first data set includes inferring the selected trait. The method may include: receiving, from the user, a selection of a fairness test to perform, and wherein the analyzing the second data set includes performing the selected fairness test. The method may further include: receiving, from the user, a definition of a schema of the first data set. The method may additionally include sanitizing the first data set to remove the at least one item of PII. The method may include generating the second data set by replacing the at least one item of PII with an anonymous identifier.

In another example, a computer-implemented method for processing data may comprise: receiving, from a user, a first data set including at least one item of personally identifiable information ("PII") for a plurality of individuals, wherein the first data set includes information related to an outcome of an algorithm or process; analyzing the received first data set to infer at least one trait of the plurality of individuals; creating a second data set by removing the at least one item of PII and inserting a code reflecting the at least one trait; and storing the second data set in a data store, wherein the second data set includes the at least one trait, and wherein the second data set does not include the at least one item of PII, and wherein the data store is inaccessible by the user.

Any of the methods disclosed herein may include any of the following steps or features. The analyzing the received first data set may be performed in a secure computing environment. Personnel of an entity operating the data store may be prevented from accessing the secure computing environment. The method may further comprise: using the inferred at least on trait, generating a report; and providing the report to the user, wherein the report is configured so as to prevent the user from associating the at least one inferred trait with any one of the plurality of individuals. The at least one trait may include at least one of race, gender, age, sexual orientation, citizenship status, ethnicity, financial information, or familial status. The method may further include receiving, from the user, a selection of a trait to infer, and wherein the analyzing the received first data set includes inferring the selected trait.

An exemplary system for processing data may comprise: a portal configured to receive a first data set from a user computing device, wherein the first data set includes at least one item of personally identifiable information ("PII") for one or more individuals and information related to an outcome of an algorithm or process; a server configured to analyze the first data set to infer at least one trait of the one or more individuals; and a data store configured to receive a second data set including the at least one trait, and wherein the second data set does not include the at least one item of PII, wherein the user computing device and personnel of an entity operating the data store are prevented from accessing the server.

Any of the systems or methods disclosed herein may include any of the following features. The at least one trait may include at least one of race, gender, age, sexual orientation, citizenship status, ethnicity, financial information, or familial status. The portal may be further configured to receive a selection of at least one trait to infer, and wherein the server is configured to analyze the first data set to infer the at least one selected trait. The server may operate for a finite time only after the portal receives a request from another computing device.

It is to be understood that both the foregoing general description and the following detailed description are exemplary and explanatory only and are not restrictive of the disclosed examples, as claimed.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals when feasible.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

BRIEF DESCRIPTION OF THE DRAWINGS

The accompanying drawings, which are incorporated in and constitute a part of this specification, illustrate various exemplary examples and together with the description, serve to explain the principles of the disclosed examples.

DETAILED DESCRIPTION

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Terms, such as, "substantially," "approximately," and "generally," are used to indicate a possible variation of ±10% of a stated or understood value. It will also be understood that, although the terms first, second, third, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "application" may be used interchangeably with other terms like "program," or the like, and generally encompasses software that is configured to interact with, modify, override, supplement, or operate in conjunction with other software. In some examples, the application may be a local application installed on a computing device. In other examples, the application may be a web application launched in a web browser, e.g., on the computing device.

According to aspects of this disclosure, systems and methods for analyzing fairness or bias, sensitivity, and/or disparate impact are disclosed. As used herein, the term "fairness" also encompasses metrics or other values (e.g., bias, sensitivity, and/or disparate impact) that a user or other party may analyze to determine fairness. Although certain elements and steps are described below, it will be appreciated that, unless otherwise specified, those elements and steps may be omitted or included in different combinations or orders. A user (e.g., a company, a government entity, or an individual) may utilize an algorithm or other method to make determinations about applicants, or other individuals or entities. Although the term "algorithm" is used herein, it is not limiting, and the disclosure encompasses other types of processes. Similarly, although the term "applicant" is used herein, it is also not limiting, and the disclosure should be understood as incorporating any type of individual or entity. For example, the user may utilize the algorithm in order to determine whether to offer or decline employment, credit, insurance, housing, government benefits, admission, or other goods or services. The user may store data regarding the outcomes of its algorithm(s). The user or another entity (e.g., a regulatory entity) may desire to know whether the algorithm is fair or biased. In order to evaluate the algorithm, the user (or another entity) may input data reflecting outcomes of the algorithm to a system. The system may analyze the data to infer characteristics (e.g., protected class characteristics), such as race, gender, age, or other demographic information including but not limited to, sexual orientation, citizenship status, ethnicity, financial information, familial status, sex, gender expression and/or identification, disability, national origin, religion, genetic information, and/or veteran status. Using the inferred characteristics, the system may evaluate the fairness or bias, sensitivity, and/or disparate impact of the algorithm and present reports to the user (or a third party, such as a regulator). As discussed above, an evaluation of "fairness," as used herein, encompasses providing values or metrics (such as bias, sensitivity, and/or disparate impact) that a user or other party may analyze to determine fairness and is not limited to a final assessment of whether an algorithm is "fair."

The user and an entity that operates or provides the system (referred to herein as "provider entity") may both desire to limit their respective access to certain types of data. For example, the user's data may include personally identifiable information ("PII") (e.g., full names, social security numbers, dates of birth, addresses, phone numbers, driver's license numbers, etc.). The provider entity may desire to be prevented from viewing or accessing the PII, for data security, legal compliance, liability or other reasons. The user, on the other hand, may desire to be prevented from accessing the inferred characteristics about the applicants. The system may include a secure environment for inferring characteristics while preventing the user and the provider entity from accessing certain types of information. For example, the secure environment may infer characteristics regarding applicants and also may strip the user's data of PII relating to the applicants, or otherwise sanitize the data of PII, before storing data reflecting the inferred characteristics on the system. The secure environment may be inaccessible by personnel of the provider entity operating the system and by the users. The data store storing the data reflecting the inferred characteristics also may be inaccessible to the users. After analyzing the stored data reflecting the inferred characteristics, the system may provide reports to the user. The reports may reflect the aggregate results of the analysis but may lack granularity that would enable the user to tie the inferred characteristics to an applicant. Thus, the system may facilitate analysis of a user's algorithm without requiring the user or the provider entity to store undesired or potentially sensitive information. Details of the system and related methods are described below. Any descriptions below regarding characteristics of users, data, and/or algorithms is merely for convenience of explanation and are not limiting. Similarly, any descriptions of exemplary inferred traits or fairness or bias, sensitivity, and/or disparate impact tests are merely for sake of example and are not limiting.

Figure 1:
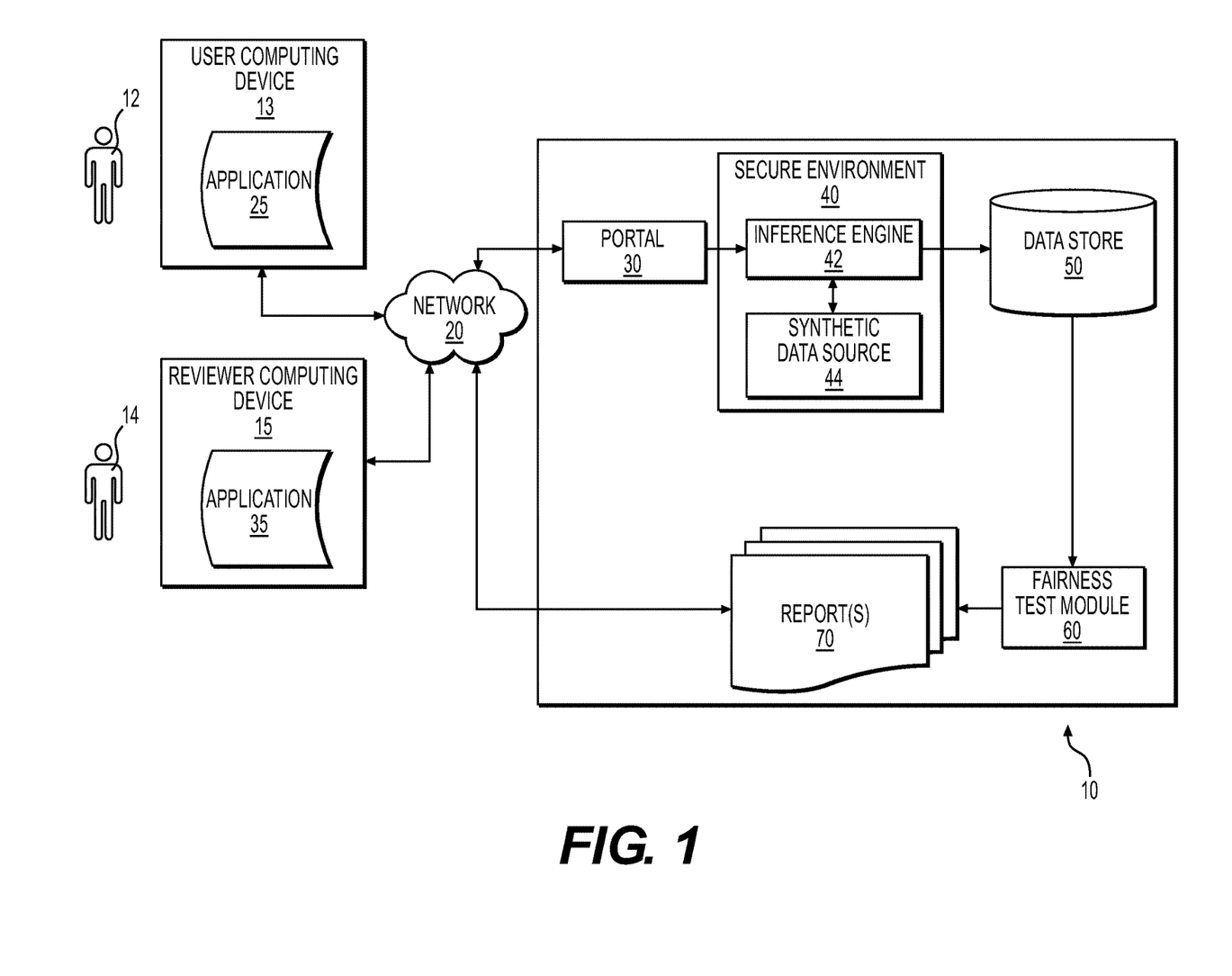
FIG. 1 depicts an exemplary system for analyzing fairness or bias, sensitivity, and/or disparate impact according to one or more examples.

FIG. 1 depicts an environment for executing techniques described herein. For example, one or more components of the environment, such as system 10, may be utilized to analyze fairness/bias, sensitivity, and/or disparate impact. Although fairness/bias is referred to herein as shorthand, it will be appreciated that reference to fairness/bias also may include sensitivity, disparate impact, or other statistical outcomes of an algorithm or other process. A user computing device 13 and/or a reviewer computing device 15 may be computing devices that communicate with one or more of the other components of the environment across electronic network 20, including a system 10 associated with a provider entity, discussed below. The user computing device 13 may be associated with a user 12 that consumes (or seeks to consume) services of the provider entity (e.g., the entity associated with system 10). At least one example service of the provider entity consumed by the user 12 may include analysis of fairness, bias, sensitivity, and/or disparate impact. The reviewer computing device 15 may be associated with a reviewer 14 that seeks information regarding the fairness and/or bias of one or more algorithms or processes of user 12. The provider entity may include an architect and/or manager of system 10.

Components of the environment, such as user computing device 13, reviewer computing device 15, and system 10 may communicate in any appropriate arrangement across network 20. Network 20 may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, network 20 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. User computing device 13, reviewer computing device 15, and one or more components of system 10 may be connected via the network 20, using one or more standard communication protocols. User computing device 13, reviewer computing device 15, and one or more components of systems 10 may transmit and receive communications from each other across the network 20, as discussed in more detail below.

User computing device 13 and/or reviewer computing device 15 may be configured to enable access to and/or interaction with other systems in the environment 10 to determine fairness and/or bias in one or more algorithms or processes of user 12. For example, user computing device 13 and/or reviewer computing device 15 may be a computer system such as, for example, a desktop computer, a laptop computer, a tablet, a smart cellular phone (e.g., a mobile phone), a smart watch or other electronic wearable, etc.

In some embodiments, user computing device 13 and/or reviewer computing device 15 may include one or more electronic application(s), e.g., a program, plugin, browser extension, etc., installed on a memory of the respective devices. The electronic application(s) may include one or more of system control software, system monitoring software, software development tools, etc. In some embodiments, the electronic application(s) may be associated with one or more of the other components in the environment. For example, one or more of the electronic application(s) may include client applications associated with a provider entity associated with system 10 (e.g., a client application of the provider entity), such as application 25 that is executable on the user computing device 13 or application 35 that is executable on the reviewer computing device 15. In some examples, one or more of applications 25, 35 may include thick client applications that are locally installed on the respective devices (e.g., desktop applications or mobile applications). In other examples, one or more of the client applications may include thin client applications (e.g., web applications) that are rendered via a web browser launched on the respective devices. Although user interfaces of application 25 may be discussed in particular below, it will be appreciated that application 35 may present some or all of the same or similar interfaces to reviewer 13.

Additionally, one or more components of the user computing device 13 and/or reviewing computing device 15 may generate, or may cause to be generated, one or more graphic user interfaces (GUIs) based on instructions/information stored in the memory, instructions/information received from the other systems in the environment, and/or the like and may cause the GUIs to be displayed via a display of the respective devices. The GUIs may be, e.g., mobile application interfaces or browser user interfaces and may include text, input text boxes, selection controls, and/or the like. The display may include a touch screen or a display with other input systems (e.g., a mouse, keyboard, etc.) for the users of the respective devices to control the functions thereof.

System 10 may include a portal 30 for receiving data from user 12 via user computing device 13 over the network 20. The data may reflect outcomes from an algorithm or other type of process performed by user 12. System 10 also may include a secure environment 40, which may be inaccessible by user 12 and personnel of the provider entity operating system 10. Secure environment 40 may include an inference engine 42, configured to securely analyze the data provided by user 12 and infer at least one trait, such as race, gender, age, sexual orientation, citizenship status, ethnicity, financial information, familial status, etc. The data with the inferred trait(s) but stripped (e.g., sanitized) of PII may be stored in a data store 50. In alternative arrangements, system 10 may generate a new set of data (using, e.g., data uploaded by user 12 and/or synthetic data) including the inferred trait(s) and may store the new data set with the inferred trait(s). The new data set may not include PII. Accordingly, in either arrangement, data stored in data store 50 excludes PII.

A fairness test module 60 may apply one or more fairness tests to the data from data store 50 to assess fairness and/or bias in the algorithm/process of user 12. Using the outcome from fairness test module 60, an element of system 10 may prepare one or more report(s) 70. For example, fairness test module 60 may prepare and/or output report(s) 70. Alternatively, the provider entity (e.g., personnel associated with the provider entity) may prepare report(s) 70, which may be provided to user 12 and/or reviewer 14 via system 10 (e.g., via portal 30, application 25, and/or application 35). Report(s) 70 may include, for example, charts, graphs, and/or written reports. Report(s) 70 may reflect or otherwise be related to a fairness or bias of the algorithm of user 12. Report(s) 70 may include aggregated data that is not traceable to any individual. As discussed below, system 10 may operate to prevent access by user 12 of the inferred traits that may be tied to individuals. System 10 may also operate to prevent access to PII by a provider entity operating system 10. Although various modules and engines are discussed below, it will be appreciated that the number and arrangement of modules/engines is merely exemplary. The modules/engines may be combined, omitted, or divided in any suitable manner.

As shown in FIG. 1, a user 12 may access system 10 via user computing device 13. Although one user 12 is depicted for convenience in FIG. 1, it will be appreciated that a plurality of users 12, each having a respective one or more user computing devices 13, may access system 10. User 12 may include a company, a government entity, or an individual. In examples, user 12 may include a company that utilizes an algorithm or other process to make decisions. For example, user 12 may receive applications for employment, credit, insurance, housing, government benefits, admission, or other goods or services. User 12 may utilize an algorithm to evaluate the applications and to make determinations regarding the applications. Such determinations may include, for example, approval, denial, interest rate, employment, promotional offers, targeted advertisement, pricing (e.g., insurance rate), down payment requirements, co-signer requirements, agreement terms, or any other determination relevant to the applications. Although applications are referred to herein, it will be appreciated that determinations could be made without an application being made (e.g., promotional offers, targeted advertising, interest rate changes, credit limit changes, etc.). The disclosure is not limited to any particular type of determination and encompasses any type of determination that may be subject to an algorithm or other process of user 12. For example, user 12 may operate one or more tools, such as back-end tools. Such back-end tools may include, for example, facial-recognition tools or natural language processing tools. The disclosure encompasses outcomes/determinations of such tools, and references herein to algorithms should be understood as encompassing such tools.

User 12 may possess data reflecting its determinations. For example, user 12 may possess data reflecting information collected from applicants and the outcome of user 12's algorithm. The following example is provided for illustrative purposes only and is not limiting. User 12 may be, for example, a financial institution that provides credit to individuals. User 12 may receive an application for credit from an individual. The individual may provide, for example, information regarding their full name, address, social security number, driver's license number, employment, past addresses, income, aliases/former names, bank account balances, and/or any other information. User 12 may utilize an algorithm or other process to make determinations, for example, about whether to offer the individual credit and/or an interest rate at which the credit is offered. User 12 may store information that the applicant provides, as well as an outcome of its algorithm or other process. Different users 12 may receive different types of information, make different determinations, and use different algorithms/processes, depending on their business or other practices.

User 12 may desire to evaluate its algorithm or other process for fairness (or, as discussed above, metrics that user 12 or another party may interpret in order to assess fairness). For example, user 12 may desire to determine whether its algorithm considers applicants fairly or is biased with respect to factors such as race, gender, age, sexual orientation, citizenship status, ethnicity, financial information, familial status, etc. The meaning of "fair" and/or "bias" may depend on the context in which user 12 operates. For example, financial information may be an important and legitimate criterion on which a financial institution may assess an applicant for a loan. But financial information may be a trait on which a university is barred from or does not desire to evaluate applicants upon. The disclosure is not limited to any one definition of "fairness" or "bias," and is adapted to evaluate different types of determination schemes.

Additionally or alternatively, user 12 may include a regulatory body or other third party that desires to evaluate algorithms or other processes of another entity (e.g., a regulated entity). Such a user 12 may desire to understand whether the third party entity's algorithm is fair or biased. The user 12 may possess data from the third party and may submit it to system 10, as described below. The above description of user 12 is merely exemplary. Any type of user 12 may utilize system 10.

User 12 may access, via user computing device 13, application 25 of system 10. By way of examples only, application 25 may be rendered via a web browser launched on user computing device 13 or via a separate, locally-stored application. Application 25 may include one or more interfaces (e.g., interactive user interfaces) with which user 12 may interact. One or more interfaces of application 25 may include any suitable boxes (e.g., text boxes, check boxes), buttons, drop-downs, drag-and-drop wizards, or other features that facilitate an interaction between user 12 and application 25. Application 25 may include a login interface, on which user 12 may enter information such as authentication information (e.g., username, password, passcode, passphrase, etc.), billing ID, and/or other information. The login interface may include a button or element that user 12 may interact with in order to log in to application 25.

After user 12 has logged in to system 10, application 25 may cause display, via user computing device 13, of an interface (e.g., interactive user interface) that permits user 12 to view previous analyses/projects and/or to create a new analysis/project. For example, system 10 may transmit the interface to the user computing device 13. If user 12 elects to create a new project, application 25 may cause display, via user computing device 13 of an interface to user 12 that enables user 12 to select traits that user 12 would like system 10 to infer from data belonging to user 12. For example, user 12 may select checkboxes, radio buttons, dropdown items, or may enter text in text boxes. User 12 may select one or more traits for system 10 to infer. Examples of traits that system 10 may infer include, for example, race, gender, age, sexual orientation, citizenship status, ethnicity, financial information, familial status, etc. User 12 may desire to ensure that its algorithm (or an algorithm of a third party) is not biased based on the selected traits. Different types of users 12 may be interested in inferring different traits. For example, a user 12 that is an educational institution that performs (or desires to perform) need-blind admissions may be interested in system 10 inferring financial information, to assess whether an algorithm/process is fair or biased as to that trait. A user 12 that is a financial institution may desire system 10 to infer information about race or gender to assess bias of an algorithm with respect to those traits. A user 12 that is an employer may desire system 10 to infer information about race, gender, age, sexual orientation, familial status, or other traits. The above examples are illustrative and not in any way limiting. In alternatives, other parties may select the traits for system 10 to infer. For example, the provider entity may specify the traits for system 10 to infer (e.g., after data has been submitted to system 10), or another party (e.g., a reviewer 13 or another third-party entity) may specify the traits to infer. For example, application 35 may present a user interface to reviewer 13 for reviewer 13 to select one or more traits to infer.

The traits may include traits that are legally protected. For example, constitutional, statutory, or regulatory provisions may bar or limit discrimination on the basis of certain traits and/or may bar user 12 from requesting or possessing information about the traits. Additionally or alternatively, user 12 may desire not to acquire or possess such information, even if not barred by regulation or law from possessing such information.

On a same or different interface as an interface for selecting traits to infer, application 25 may provide a user interface for inputting information related to data user 12 will submit for analysis by system 10. For example, application 25 may include one or more user interfaces for defining a data schema. In examples, application 25 may utilize a drag-and drop wizard allowing user 12 to define parameters such as a Unique ID (e.g., a social security number of other identifier), inputs upon which inferences may be drawn (e.g., full name, address, educational information, etc.), outcome variables of the algorithm/process of user 12 (e.g., approval or denial decisions, interest rate, special offer(s), employment offers, promotional offers, targeted advertisement, pricing (e.g., insurance rate), down payment requirements, co-signer requirements, or any other determination), and/or covariates/control variables (e.g., FICO score, standardized test score, grade point average). Application 25 may also include an interface (on a same or different interface as an interface for defining a schema) that allows user 12 to upload a file (e.g., a .csv file or a .json file) of data following the defined schema.

On a same or a different interface as an interface for defining a schema and/or uploading a data file, application 25 may provide a user interface that facilitates selection by a user 12 of which fairness tests (fairness tests are further discussed below) to perform and which outputs to provide. Examples of outputs may include a pie chart (e.g., a demographic pie chart displaying applicants' inferred traits), a summary table, graphs (e.g., interest rate vs. FICO for each inferred trait), and/or a regression analysis. The user interface of application 25 may provide a gallery of example outputs. Additionally or alternatively, the user interface of application 25 may provide a wizard that guides user 12 through defining a custom report. The user interface may also include a button or other feature that allows user 12 to submit the data and selections for processing by system 10. In alternatives, other parties may select the fairness tests for system 10 to perform. For example, the provider entity may specify the fairness tests to perform (e.g., after data has been submitted to system 10), or another party (e.g., a reviewer 13 or another third-party entity) may specify the fairness tests to perform. For example, application 35 may present a user interface to reviewer 13 for reviewer 13 to select one or more fairness tests.

A user interface of application 25 may include an interactive element (e.g., a button) that user 12 may interact with in order to submit uploaded data and selections made by user 12 via application 25 to system 10. For example, application 25 may transmit data to portal 30. After user 12 interacts with the interactive element, application 25 may make a request to a website or other service (e.g., a US federal government website) to determine a Geographic Identifier ("GEOID") associated with an applicant's address. As explained below, system 10 may utilize the GEOID in evaluating the data of user 12. If the GEOID request fails, then application 25 may provide an error message to user 12. User 12 may resubmit the data and selections at a later time, or application 25 may automatically resubmit the GEOID request at a later time.

In some examples, application 25 also may have functionality to remove some of the data from the data uploaded by user 12, before making a request to portal 30 and/or transmitting data to portal 30. For example, application 25 may locate in the uploaded data (e.g., the .csv file) the fields of data that are necessary for the analysis of system 10 (e.g., the fields necessary to perform the selected fairness tests). Such data may include, for example, first name, last name, address, unique identifier, credit score, and a disposition of the algorithm of user 21. The identified data may be copied into the request from application 25. In another example, based on the selections made by user 12 in the user interfaces of application 25 (e.g., which fairness tests to perform), application 25 may determine that portions of the data provided (e.g., uploaded) by user 12 is unnecessary to perform the selected fairness tests. Application 25 may scrub the unnecessary data (which may or may not include PII) before the data is transmitted to system 10 (e.g., via portal 30). Alternatively or additionally, portal 30 may include an ingestion filter to scrub/strip any unnecessary data and/or PII. Such an ingestion filter may substitute or augment any of the other mechanisms or processes for scrubbing/sanitizing data discussed herein.

In addition to or in alternative to application 25 receiving the information described above via one or more user interfaces, system 10 may grant an application programming interface ("API") access to applications operated by a provider entity operating system 10 (e.g., provider entity) or by third-party entities, such as user 12. User 12 or a third-party may request API access, which system 10 may grant. This API access may facilitate entry and/or uploading of data via third-party applications (e.g., applications of user 12) and/or applications operated by the provider entity operating system 10 (e.g., provider entity). Multiple applications (e.g., third-party applications) may be able to upload data to system 10 via the API access. In examples, an application utilized by user 12 for managing applications or otherwise managing data may include functionality to allow user 12 to easily upload data to system 10 for analysis. For example, an application of user 12 may include buttons, fields, etc. that may facilitate user 12 submitting data to system 10 without switching applications and/or departing an environment utilized by user 12. Following establishment of the API gateway, an application of user 12 also may automatically transmit new data to system 10 for ongoing analysis (e.g., to identify bias/fairness trends or changes). Additionally or alternatively, API access may provide system 10 with algorithmic outcomes/decisions using synthetic data. For example, in a scenario in which user 12 is a bank with a credit-underwriting algorithm, system 10 may transmit synthetic data (e.g., synthetic applications) to the underwriting algorithm to obtain information about the underwriting decisions. System 10 may be able to test a sensitivity of an analyzed algorithm to differences in applications via such synthetic data.

Until user 12 submits data (e.g., by clicking a button or otherwise interacting with application 25), some or all elements of system 10 (including portal 30) may be inactive (i.e., not running). Application 25 may submit a request (e.g., an HTTP POST request) to portal 30 (or another element of system 10) after user 12 interacts an interactive element of a user interface of application 25 to "submit" data and selections. The request by application 25 may trigger a temporary execution environment of system 10. Some or all elements of system 10 may be running/active for only a finite amount of time, after receiving the request from application 25. Application 25 may securely transmit data (which may include, e.g., the data provided/uploaded by user 12 and data reflecting selections by user 12 made via user interfaces of application 25) to portal 30 of system 10.

Portal 30 may transmit the received data to secure environment 40. Secure environment 40 may include, for example, a server or other computing device. Secure environment 40 may be any type of secure computing environment that prevents access to secure environment, as described below. As discussed above, the data uploaded by user 12 may include at least one item of PII. A provider entity that is operating system 10 may desire to avoid storing PII in locations that are accessible by personnel associated with the entity. Such PII may require special handling and/or security measures that the provider entity does not desire to undertake. Additionally, as such PII may be the subject of data breaches, the provider entity may desire to avoid storing PII. User 12 may desire to avoid having information that could identifiably tie a particular record in their data (e.g., an individual) to an inferred trait (e.g., race, gender, etc.). For example, user 12 may be limited (via, e.g., a policy of user 12, a statue, or a regulation) from inquiring about such traits or from making determinations on the basis of such traits. Using secure environment 40, system 10 may satisfy such desires of user 12 and the provider entity operating system 10. As discussed in further detail below, secure environment 40 may prevent or limit access of the provider entity operating system 10 from accessing PII of the data of user 12. Secure environment 40 may also prevent or limit user 12 from possessing data identifiably tying inferred traits to individual records in the data of user 12.

Secure environment 40 may include one or more modules. For example, secure environment 40 may include an inference engine 42 and a synthetic data source 44. Inference engine 42 may be configured to infer at least one trait based on the data provided by user 12, including the trait(s) selected by user 12 via portal 30. Inference engine 42 may utilize any known or to-be-developed methods of inferring trait(s) from data. Inference engine 42 may have capabilities to infer one or more trait(s), including traits such as race, gender, age, sexual orientation, citizenship status, ethnicity, financial information, familial status, etc. For example, inference engine may utilize the GEOID in the Bayesian Improved First Name Surname Geocoding ("BIFSG") method to infer trait(s).

Synthetic data source 44 may be utilized in some circumstances to facilitate analysis by inference engine 42. For example, user 12 may desire system 10 to analyze an algorithm/process that has not yet been implemented or that has been altered. For example, user 12 may include a regulator or an entity that is seeking to implement the algorithm/process. System 10 may apply the algorithm/process to synthetic data in order to generate outcomes. Inference engine 42 may then analyze the synthetic data and the generated outcomes to infer traits regarding the synthetic data. Additionally or alternatively, synthetic data source 44 may augment data uploaded by user 12. For example, synthetic data source 44 may augment the data uploaded by user 12 in situations in which the uploaded data is not adequately representative of performance of an algorithm/process of user 12. For example, if user 12 plans to expand into a new geographic area, synthetic data may be utilized to provide a data set that is representative of the new geographic area. Synthetic data may also be utilized, for example, when user 12 plans to increase advertising, offer new products that may appeal to new audiences, or make other changes that would alter performance of an algorithm/process. Synthetic data may also be utilized when user 12 possesses only an insufficient amount of data in order to analyze bias/fairness of an algorithm of user 12.

After inferring the traits selected by user 12, inference engine 42, or another module of secure environment 40, may assign an anonymized identifier (e.g., a row id) to each record of the data. Alternatively, application 25 may assign the row id. Inference engine 42 may remove some or all PII from the data provided by user 12 or otherwise sanitize the data provided by user. For example, inference engine 42 may work record by record to strip the data of PII and to insert inferred characteristic(s). Inference engine 42 may remove the unique ID assigned to the data by user 12. In some examples, inference engine 42 may replace PII with codes indicative of inferred characteristics. If user 12 later uploads additional data for analysis, the anonymous identifier may serve to de-duplicate the data of records that were previously analyzed. The anonymous identifier assigned to a record may remain constant each time that the data is uploaded to system 10. Inference engine 42 may omit inferring traits from records that have already been analyzed, based on the anonymous identifier.

User 12 may be barred from accessing information generated and/or stored in secure environment 40. For example, user 12 may be unable to access information about one or more traits inferred by inference engine 42. Therefore, secure environment 40 may enable user 12 to avoid possessing information about traits, such as race or gender, for individuals. Secure environment 40 may also prevent access by a provider entity that operates system 10, such that the provider entity (and its personnel) is unable to access PII. Although secure environment 40 may be a component of system 10, and may be hosted by, operated by, and/or owned by the entity, personnel of the provider entity may be unable to access the data stored therein. Secure environment 40 may thus blind user 12 to information user 12 does not wish to possess/is not permitted to possess (e.g., traits such as race, gender, or any of the traits discussed herein) and may blind the provider entity to PII, such as full name, address, social security number, etc. Secure environment 40 may be compared to a wall, with inference engine 42 operating within the wall. Additionally or alternatively, secure environment 40 may be compared to a double-sided filter, which filters out different information from user 12 and an entity operating system 10.

In examples of system 10, no portion of system 10 may store PII after inference engine 42 has inferred the selected traits and stripped the data of PII and may perform inferences on-the-fly. In other words, inference engine 42 may not provide long-term storage of data having PII. In examples, elements of secure environment 40, such as inference engine 42, operate for a discrete amount of time after portal 30 receives a request from user computing device 13. Inference engine 42 may, during the discrete amount of time, sanitize the data received from user computing device 13, such that system 10 possesses PII for only the discrete amount of time (i.e., seconds or mintues). Thus, system 10, including secure environment 40, provides technical improvements to technologies, including computer systems. For example, methods 100 and 200 provide an improved technology for storing and processing data, to provide for a double-sided filter, as described above.

An output from inference engine 42 and/or synthetic data may be stored in a data store 50. Data stored in data store 50 may lack any PII because it has been removed by a component of secure environment 40 (such as inference engine 42), as described above. In other words, the data stored in data store 50 may be sanitized. The data stored in data store 50 may include the traits that the user 12 selected in application 25, along with the anonymized identifier. Unlike secure environment 40, personnel of the entity operating system 10 and other components of system 10 may access data stored in data store 50. In some examples, data store 50 may store encrypted data, as a further measure of security (e.g., when data stored in data store 50 includes sufficient detail such that, although the individual data categories do not include PII, the data could potentially be tied to a particular user). The data stored in data store 50 may include only the data about inferred traits or may additionally include other information, such as the anonymous identifier discussed above, or other information from the data uploaded by user 12 (with the PII stripped from the data).

A fairness test module 60 may be in electronic communication with data store 50. Fairness test module 60 may receive data transmitted by data store 50. Fairness test module may analyze the data stored in data store 50 to determine a fairness of an algorithm of user 12. Fairness test module 60 may apply one or more fairness tests, such as statistical tests, to analyze whether an algorithm/process of user 12 exhibits bias or is fair. Fairness test module 60 may assess and/or determine whether the algorithm/process has biased or fair outcomes for individuals with the inferred traits. For example, fairness test module 60 may assess whether the process/algorithm is biased based on, for example, race, gender, age, sexual orientation, citizenship status, ethnicity, financial information, familial status, etc. In other words, fairness test module 60 may analyze whether outcomes of the process/algorithm are fair or biased with respect to the selected, inferred trait(s).

Based on the analysis of fairness test module 60, a component of system 10 may generate one or more report(s) 70. The generated report(s) 70 may correspond to the report(s) selected by user 12 in module 30, as discussed above. For example, generated report(s) 70 may include a pie chart (e.g., a demographic pie chart displaying applicants' inferred traits), a summary table, graphs (e.g., interest rate vs. FICO for each inferred trait), a regression analysis, and/or another type of written analysis. Report(s) 70 may include a summary of the inferred traits but may not include information that would permit tying individual user(s) to the inferred trait(s). In other words, a level of granularity of report(s) 70 may be such that user 12 may not determine traits of any individual user. System 10 may include functionality to determine whether a report 70 is sufficiently anonymized. If an element of system 10 (e.g., fairness test module 60 or another element) determines that a report 70 would permit user 12 to determine traits of any particular individual, system 10 may generate an error message and/or may provide an alternative report type, augment the analysis with synthetic data to further anonymize report 70, or require user 12 to provide additional information or select an alternative report.

System 10 may provide report(s) to user 12 and/or a reviewer 14. A reviewer 14 may be a third party (separate from user 12), such as a regulator, auditor, or other third party desiring to assess an algorithm/process of user 12. For example, reports may be transmitted to user 12 and/or reviewer 14 via secure message, email, and/or via portal 30, application 25, and/or application 35. For example, applications 25, 35 may include one or more user interfaces allowing user 12 and/or reviewer 14 to view and/or download the report(s).]

Although depicted as separate components in FIG. 1, it should be understood that a component or portion of a component in the exemplary environment 10 may, in some embodiments, be integrated with or incorporated into one or more other components. For example, inference engine 42 and synthetic data source 44 may be combined in one component. In some embodiments, operations or aspects of one or more of the components discussed above may be distributed amongst one or more other components. Any suitable arrangement and/or integration of the various systems and devices of the exemplary environment 10 may be used.

In the following disclosure, various acts may be described as performed or executed by a component from FIG. 1, such as user computing device 13, reviewer computing device 15, portal 30, secure environment 40, and/or fairness test module 60, or components thereof. However, it should be understood that in various embodiments, various components in the environment of FIG. 1 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
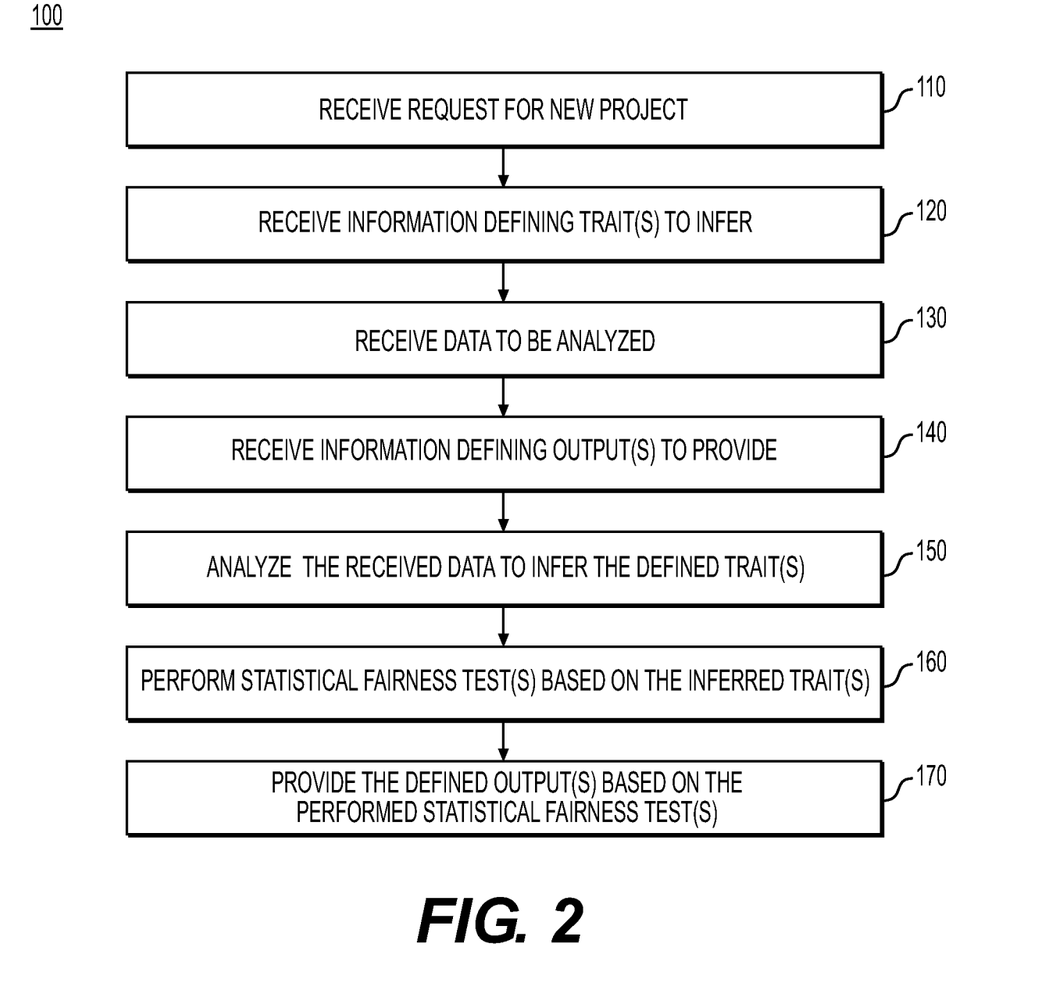
FIG. 2 depicts a flowchart of an exemplary method of receiving data, analyzing data, and reporting on fairness or bias, sensitivity, and/or disparate impact metrics, according to one or more examples.
Figure 3:
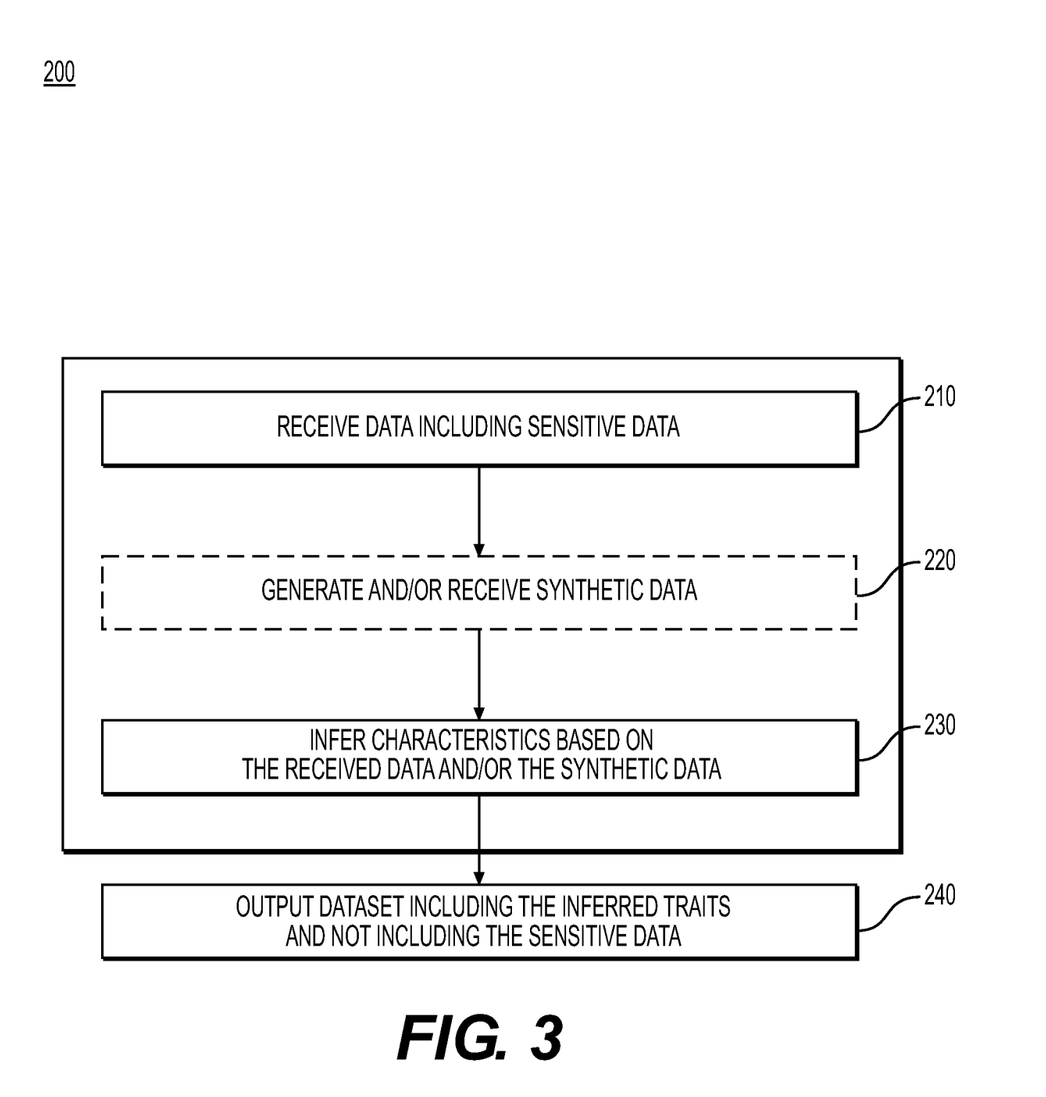
FIG. 3 depicts a flowchart of an exemplary method of securely analyzing the data received in the method of FIG. 2, according to one or more examples.

Turning to FIGS. 2 and 3, methods 100 and 200 for processing data to infer traits is described below. As discussed in further detail below, method 200 (FIG. 3) may provide greater detail regarding step 150 of method 100. System 10 (FIG. 1) may perform any or all of the steps of methods 100 and 200. While certain functionalities of system 10 discussed above may have been omitted from the flow charts of FIGS. 2 and 3 for conciseness, it is understood that either or both of methods of 100 and 200 may include one or more additional steps to perform such functionalities. In describing methods 100 and 200, reference is made to the discussion of system 10, above, all details of which may be incorporated into the discussion of methods 100 and 200, below.

With reference to FIG. 2, step 110 of method 100 may include receiving a request for a new project. For example, portal 30 of system 10, as described above, alone or in combination with other elements of system 10, may receive a request from user computing device 13. The request received in step 110 may be from user 12. Step 110 may include logging in to system 10 and/or creating a new project, as described above with respect to FIG. 1. For example, as discussed above, system 10 may receive from user 12 (via user computing device 13) a user name and password and/or an input (e.g., a button click) requesting creation of a new project.

Step 120 may include receiving information defining trait(s) to infer. Step 120 may be performed by, for example, portal 30 of system 10, which may receive information from user computing device 13. As discussed above, portal 30 may receive from user 12 (via application 25 of user computer device 13) a selection of one or more traits for system 10 to infer, such as for example, race, gender, age, sexual orientation, citizenship status, ethnicity, financial information, familial status, etc. Alternatively, portal 30 may receive selections from reviewer 13 (via application 35 of reviewer computing device 15 or from the provider entity). The trait(s) received in step 120 may be trait(s) for which user 12 desires to determine whether an algorithm/process of user 12 exhibits bias. The traits may include traits that are legally-protected. For example, constitutional, statutory, or regulatory provisions may bar or limit discrimination on the basis of certain traits. As discussed above, the traits received in step 120 may be traits that user 12 does not desire to possess data about and/or traits that user 12 is not permitted to possess data about. Data in step 120 may be received, e.g., via selections in checkboxes, radio buttons, or dropdown items, or text entered in text boxes on a user interface of application 25, via user computing device 13.

Step 130 may include receiving data to be analyzed. For example, a portal 30 of system 10 may receive data from user 12, via application 25 of user computing device 13. Step 130 may include receiving a data file or otherwise receiving data records reflecting inputs and outputs of an algorithm of user 12. Step 130 may also include, as discussed above, receiving information defining a schema of the data. As discussed above, step 130 may include receiving information defining data fields using a drag-and-drop wizard or other input of a user interface of application 25. In step 130, system 10 may receive parameters such as a Unique ID (e.g., an identifier specific to the dataset being transmitted to system 10), inputs upon which inferences may be drawn (e.g., full name, address, educational information, etc.), outcome variables of the algorithm/process of user 12 (e.g., approval or denial decisions, interest rate, employment offers, promotional offers, targeted advertisement, pricing (e.g., insurance rate), down payment requirements, co-signer requirements, or any other determination), and/or covariates/control variables (e.g., FICO score, standardized test score, grade point average).

In step 140, system 10 may receive information defining output(s) to provide. Step 140 may include receiving a selection from user 12 (or another party, such as the provider entity or reviewer 13, as discussed above), via user computing device 13, of which fairness tests, described above, to perform. Step 140 also may include receiving information regarding which outputs are desired by a user 12 or another party, such as reviewer 13 or the provider entity. As discussed above, exemplary outputs may include a pie chart (e.g., a demographic pie chart displaying applicants' inferred traits), a summary table, graphs (e.g., interest rate vs. FICO for each inferred trait), and/or a regression analysis. In step 140, system 10 may receive a selection of a pre-defined/standard output or a definition of a custom output. Selections received in step 140 may be received via check box selections, radio button selections, drop-down menu selections, text box inputs, drag-and-drop wizard inputs, and/or uploaded data (e.g., via application 25 or application 35). Steps 120, 130, and 140 may occur in any suitable order, depending on a user interface or other traits of system 10.

Step 150 may include analyzing the data received in step 130, in order to infer the traits defined in step 120. Step 150 may be performed by inference engine 42, which may be located within secure environment 40, as described above. Other elements of system 10 may additionally or alternatively perform step 150. Step 150 may include performing any process known or to become known in order to infer the defined traits from the received data. As discussed above, with respect to FIG. 1, step 150 also may include utilizing synthetic data from synthetic data source 44. As discussed above, synthetic data may augment data received in step 130 or may serve as a replacement for data that would otherwise be received in step 130 (e.g., for an algorithm or process that has not yet been implemented). Method 200 (FIG. 3), discussed in further detail below, provides additional details regarding step 150.

Step 160 may include performing fairness tests, using the traits inferred in step 150. The fairness tests may analyze a fairness of an algorithm that is associated with the data received in step 130. Fairness test module 60 of system 10, and/or any other suitable component of system 10, may perform step 160. As discussed above, with respect to FIG. 1, and below, with respect to FIG. 3, step 160 may analyze a data set that includes inferred traits but does not include PII from the data received from user 12 in step 130. As discussed above, step 160 may include performing any tests, such as statistical tests, to evaluate/analyze a fairness and/or bias of the algorithm or process of user 12. For example, step 160 may assess whether the process/algorithm of user 12 is biased based on, for example, race, gender, age, sexual orientation, citizenship status, ethnicity, financial information, familial status, or any other trait selected/defined user 12. In other words, step 160 may analyze whether outcomes of the process/algorithm are fair or biased. Additionally or alternatively, step 160 may include performing any tests, such as statistical tests, to evaluate/analyze whether the analyzed algorithm produces differences in outcomes among groups having any of the traits identified above or elsewhere herein. Although the terms fairness and/or bias are used in this disclosure, it will be appreciated that such references encompass whether an algorithm or process produces such differences in outcomes among various groups.

In step 170, system 10 may provide the desired outputs, such as one or more reports 70, to user 12, reviewer 14, or another party. Step 170 may provide outputs that correspond to the outputs received/defined in step 140. For example, step 170 may include outputting reports such as a pie chart (e.g., a demographic pie chart displaying applicants' inferred traits), a summary table, graphs (e.g., interest rate vs. FICO for each inferred trait), a regression analysis, and/or another type of written analysis. In step 170, system 10 may provide outputs that reflect a result of the analyses of steps 150 and 160 but may not provide granular, record-based information to user 12. Thus, step 170 may provide reports that evaluate an algorithm or process of user 12 without providing to user 12 data about inferred traits that could be tied to a particular individual. Thus, method 100 provides for analysis of fairness and/or bias without requiring user 12 to possess or receive information regarding sensitive traits, such as those discussed above. As discussed above, with respect to FIG. 1, if an element of system 10 determines that a report 70 defined by user would permit user 12 to tie inferred traits to particular individuals, system 10 may provide an error message, provide an alternative report, request that user 12 select an alternative report, supplement the analysis with synthetic data, or take other actions.

Turning to FIG. 3, method 200 provides further detail regarding the analysis of method 100. In particular, method 200 provides further details regarding steps that permit (a) an entity to analyze fairness and/or bias without receiving and/or accessing PII and (b) a user 12 to receive reports regarding fairness and/or bias without receiving and/or accessing inferred sensitive traits that can be tied to individuals. Some or all of the steps of method 200 may occur within secure environment 40 of system 10. For example, steps 210, 220, 230, discussed in further detail below, may be performed by elements of secure environment 40. The box around these steps in FIG. 3 may represent the secure environment.

In step 210, an element of system 10, such as inference engine 42 of secure processing environment 40, may receive data including sensitive data. The sensitive data may include, for example, PII, such as, e.g., full name, home address, email address, social security number, passport number, driver's license number, credit card number, date of birth, telephone number, vehicle identification number, login information, and/or IP address. The data received in step 210 may include any of the data received in steps 120, 130, and/or 140 of method 100 of FIG. 2. The data received in step 210 may be the same as data received in steps 120, 130, and/or 140 or may be a different data set than that received in steps 120, 130, and/or 140 (e.g., a data set created by/compiled by system 10).

In step 220, an element of system 10, such as synthetic data source 44, may generate and/or receive synthetic data. Step 220 is in dashed lines in FIG. 3 to show that it is an optional step, which may be performed in all, some, or none of the analyses of method 200. Synthetic data may be particularly useful where user 12 desires a prospective analysis of an algorithm or process. For example, user 12 may desire system 10 to analyze an algorithm/process that has not yet been implemented or that has been altered. In examples, user 12 may include an entity that is seeking to implement the algorithm/process, or a regulator that is seeking to analyze an algorithm of an entity. Synthetic data generated/received in step 220 may be analyzed to determine outcomes of the algorithm/process. Additionally or alternatively, synthetic data may be received/generated in step 220 in order to augment data uploaded by user 12. For example, step 220 may be performed in situations in which the uploaded data is not adequately representative of performance of an algorithm/process of user 12. For example, if user 12 plans to expand into a new geographic area, synthetic data may be utilized to provide a data set that is representative of the new geographic area. Synthetic data may also be utilized, for example, when a user 12 plans to increase advertising, offer new products that may appeal to new audiences, or make other changes that would alter performance of an algorithm/process.

In step 230, a component of system 10, such as inference engine 42, may infer traits based on the data received in step 210 and/or based on the synthetic data received or generated in step 220. As discussed above, Step 230 may include performing any process known or to become known in order to infer the defined traits from the received data. Step 230 may utilize the PII in making inferences. For example, step 230 may utilize name, address, or other information. Step 230 may include inferring any trait selected by user 12 in step 120 of method 100, such as race, gender, age, sexual orientation, citizenship status, ethnicity, financial information, familial status, etc. As discussed above, the traits desired to be inferred may depend upon the purpose of the algorithm/process of user 12. For some users 12, such as financial institutions, information such as financial information may be collected by user 12. Financial information collected by such a user 12 may or may not be analyzed in step 230 to infer traits, such as race or gender. For other users 12, such as educational institutions pursuing need-blind admissions, the user 12 may not collect information regarding financial information and may desire system 10 to infer financial information to ensure the process/algorithm of user 12 is not biased based on financial information.

In step 240, a component of system 10, such as inference engine 42 or another component, may output a dataset including the inferred traits but not including the sensitive information (e.g., the PII). The dataset may, in other words, be sanitized of PII. As discussed above, in step 240, inference engine 42, or another element of secure environment 40, may remove some or all of the PII or other sensitive information from the data uploaded by user 12 and received in step 210. Additionally or alternatively, inference engine 42 may create a new dataset including only the inferred traits and any other desired information (e.g., an identifier for each record). The data received in step 130 of method 100 and/or step 210 of method 200 may be a first data set, and the data stored in step 240 may be a second data set. The first data set may include PII but not include inferred traits. The second data set may include inferred traits but not include PII. An anonymous identifier for each record of the data may facilitate future analysis of data that may include the records analyzed in step 230. The data output in step 240 may be stored in system 10. For example, the data output in step 240 may be stored in a portion of system 10 outside of secure environment 40, such as data store 50. The data output in step 240 may be inaccessible to user 12, and thus user 12 may not possess information that could tie any individual to the inferred trait(s). An entity operating system 10, meanwhile, may have access to the data output after step 240 but not to the sensitive data received in step 210 and removed during step 240. The dataset output in step 240 may be utilized in step 160 of method 100, described above.

Thus the steps of methods 100 and 200 may protect user 12 and an entity operating system 10 from possessing or accessing data that the respective party does not desire to possess/access and/or is not permitted to possess/access. As discussed above, steps of method 200 may be performed "on-the-fly," and elements of system 10 may not retain PII following the analysis of method 200. Thus, methods 100 and 200, provide technical improvements to technologies, including computer systems. For example, system 10 provides an improved technology for storing and processing data, to provide for a double-sided filter, as described above.

Optionally, system 10 may utilize machine learning in performing any of the steps of methods 200 and/or 300. For example, inference engine 42 may, via supervised or semi-supervised learning, learn associations between data reflecting outcomes of algorithms/processes and the traits (e.g., race, gender, age, sexual orientation, citizenship status, ethnicity, financial information, familial status, etc.) associated with the records (e.g., individuals) in the data. Somewhat similarly, fairness test module 60 may, via supervised or semi-supervised learning, learn associations between traits of individuals and the fairness of an algorithm/process. Use of synthetic data and/or API access also may utilize machine learning. For example, an element of system 10 may, via supervised or semi-supervised learning, learn associations between As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

System 10 may generate, store, train, and/or use a machine-learning model configured to infer traits or evaluate fairness or bias. Elements of system 10, such as inference engine 42 and/or fairness test module 60 may include a machine-learning model and/or instructions associated with the machine-learning model, e.g., instructions for generating a machine-learning model, training the machine-learning model, using the machine-learning model etc. System 10 may include instructions for retrieving inferred trait and/or fairness data, adjusting inferred trait and/or fairness data, e.g., based on the output of the machine-learning model, and/or operating a display to output inferred trait and/or fairness data, e.g., as adjusted based on the machine-learning model. System 10 may include training data, e.g., data reflecting outcomes of an algorithm or process and/or inferred trait data, and may include ground truth, e.g., data reflecting traits associated with the outcomes and/or fairness or bias evaluations.

In some examples, a system or device other than system 10 is used to generate and/or train the machine-learning model. For example, such a system may include instructions for generating the machine-learning model, the training data and ground truth, and/or instructions for training the machine-learning model. A resulting trained-machine-learning model may then be provided to system 10.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some examples, a portion of the training data may be withheld during training and/or used to validate the trained machine-learning model, e.g., compare the output of the trained model with the ground truth for that portion of the training data to evaluate an accuracy of the trained model. For example (e.g., with respect to inference engine 42), the training of the machine-learning model may be configured to cause the machine-learning model to learn associations between data reflecting outcomes of an algorithm or process and data reflecting traits of individuals, such that the trained machine-learning model is configured to determine a trait in response to the input data reflecting an outcome of an algorithm or process based on the learned associations. In another example (e.g., with respect to fairness test module 60), the training of the machine-learning model may be configured to cause the machine-learning model to learn associations between data reflecting traits of individuals subject to an algorithm or process and assessments of fairness or bias, such that the trained machine-learning model is configured to determine a fairness or bias assessment in response to the input data reflecting traits of individuals subject to an algorithm or process, based on the learned associations.

Figure 4:
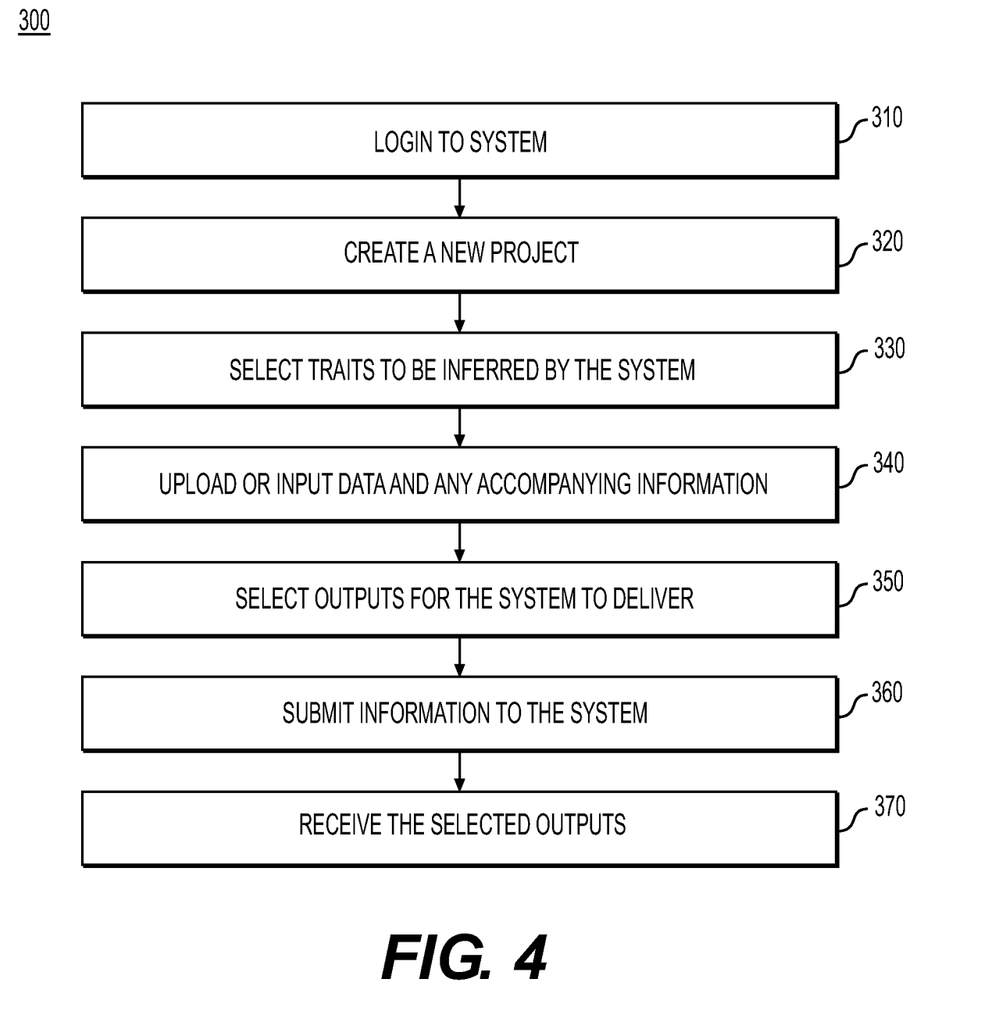
FIG. 4 depicts a flowchart of an exemplary method of inputting and receiving data, according to one or more examples.

FIG. 4 depicts a flow chart showing a method 300 of providing information to system 10 and receiving information from system 10. The steps of method 300 are merely exemplary. Method 300 may include additional steps or may omit some of the steps shown in FIG. 4. The discussion of method 300 below incorporates the discussion above of corresponding or similar steps with respect to FIGS. 1-3.

In step 310, user 12 may login to application 25. For example, user 12 may log in using a user interface of application 25 or an application (e.g., an application utilizing API). User 12 may enter information such as username, password, billing ID, or other information. User 12 may then click a button to log in to application 25. In step 320, user 12 may create a new project using, for example, application 25. For example, user 12 may click a button to initiate the creation of the new project. In step 330, using, for example, application 25, user 12 may select traits to be inferred by system 10. For example, user 12 may select checkboxes, radio buttons, dropdown items, or may enter text in text boxes. As discussed above, examples of traits that user 12 may select include, for example, race, gender, age, sexual orientation, citizenship status, ethnicity, financial information, familial status, etc. The traits may include traits that are legally-protected. For example, constitutional, statutory, or regulatory provisions may bar or limit discrimination on the basis of certain traits.

In step 340, using a component such as application 25, user 12 may upload or input data and/or accompanying information, such as a schema for the data. For example, user 12 may drag and drop information to define parameters, such as a Unique ID (e.g., identifier specific to the dataset being transmitted to system 10 or other identifier), inputs upon which inferences may be drawn (e.g., full name, address, educational information, etc.), outcome variables of the algorithm/process of user 12 (e.g., approval or denial decisions, interest rate, special offer(s), employment offers, promotional offers, targeted advertisement, pricing (e.g., insurance rate), down payment requirements, co-signer requirements, or any other determination), and/or covariates/control variables (e.g., FICO score, standardized test score, grade point average). User 12 also may upload a file (e.g., a .csv or .json file) of data following the defined schema.

In step 350, user 12 may select outputs for system 10 to deliver. Step 350 may be performed using, for example, application 25. User 12 may select which fairness tests (discussed above) for system 10 to perform, and select reports or other outputs for system 10 to provide. For example, user 12 may select a report type (e.g., graph, summary table, written report, regression analysis, etc.) from a gallery of sample reports or may define a custom report. In step 360, user 12 may submit the data and selections to system 10, by, for example, clicking a button.

In step 370, user 12 may receive the outputs selected in step 360. The outputs received may provide information regarding the selected traits, which may have been inferred by system 10. User 12 may be unable to tie any particular individual to the inferred traits on the basis of the outputs. Therefore, user 12 may receive an evaluation of its algorithm or process without accessing or possessing information regarding the inferred trait(s) of any individual. After receiving the outputs in step 370, user 12 may print, save, email, or otherwise share the outputs.

In general, any process or operation discussed in this disclosure that is understood to be computer-implementable, such as the processes illustrated in FIGS. 2-4, may be performed by one or more processors of a computer system, such any of the systems or device of system 10 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
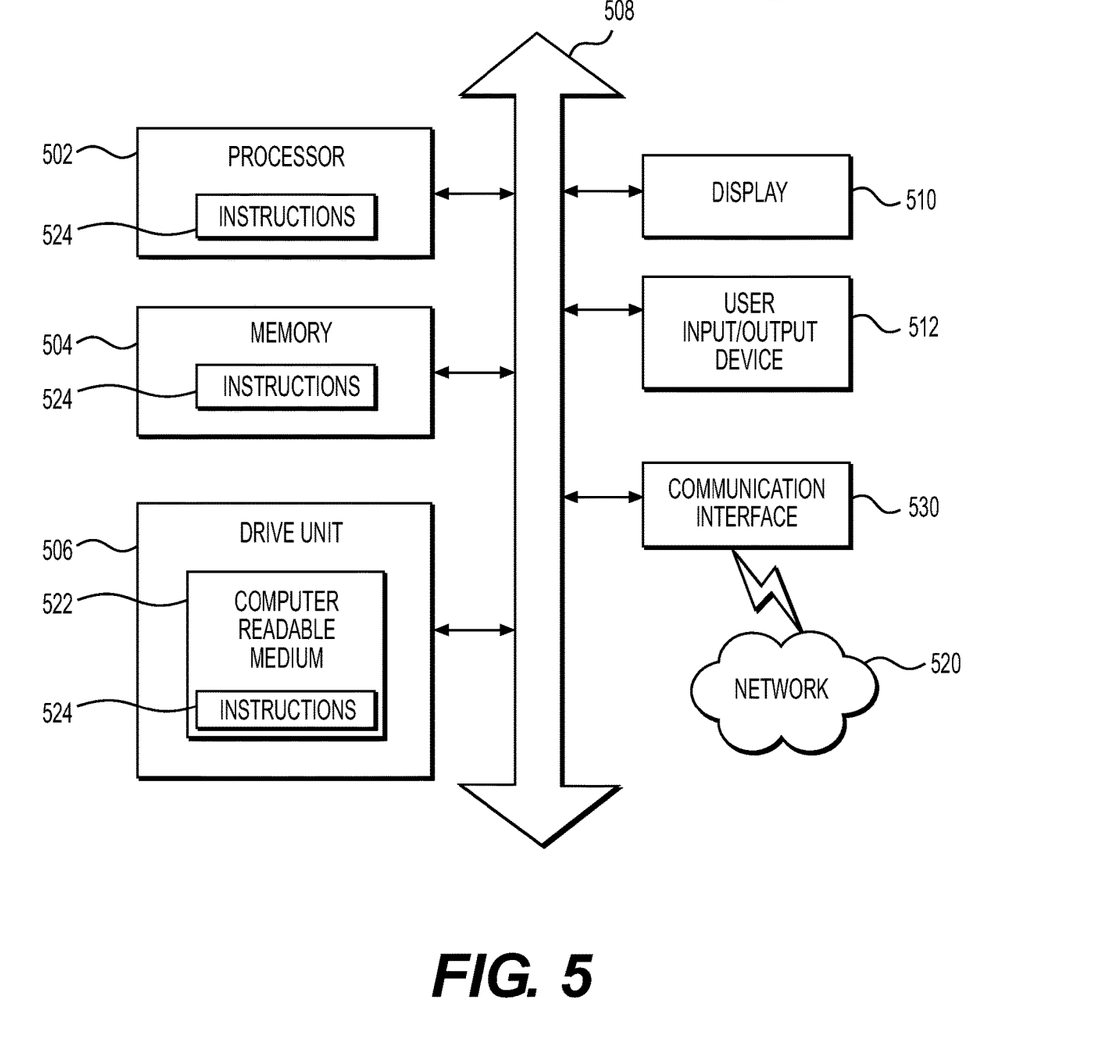
FIG. 5 depicts an example of a computing device, according to one or more examples.

FIG. 5 is a simplified functional block diagram of a computer 500 that may be configured as a device for executing the methods of FIGS. 2 and 3 and facilitating the method of FIG. 4, according to exemplary examples of the present disclosure. For example, the computer 500 may be configured as the user computing device 13, reviewer computing device 15, system 10 or a component of system 10 and/or another system according to exemplary examples of this disclosure. In various examples, any of the systems herein may be a computer 500 including, for example, a data communication interface 530 (which may include properties of application 25 and/or portal 30) for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform. A user computing device 13 and/or reviewer computing device 15 may be in communication with computer 500 (e.g., with communication interface 530) via a network 520. Alternatively, other portions of computer 500 may be connected to network 520. Network 520 may have any of the properties of network 20.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed examples may be applicable to any environment, such as a desktop or laptop computer, an automobile entertainment system, a home entertainment system, etc. Also, the disclosed examples may be applicable to any type of Internet protocol.

It should be appreciated that in the above description of exemplary examples of the invention, various features of the invention are sometimes grouped together in a single example, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed example. Thus, the claims following the Detailed Description are hereby expressly incorporated into this Detailed Description, with each claim standing on its own as a separate example of this invention.

Furthermore, while some examples described herein include some but not other features included in other examples, combinations of features of different examples are meant to be within the scope of the invention, and form different examples, as would be understood by those skilled in the art. For example, in the following claims, any of the claimed examples can be used in any combination.

Thus, while certain examples have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for processing data, comprising:
   receiving, from a user, a first data set including at least one item of personally identifiable information ("PII") for a plurality of individuals, wherein the first data set includes information related to an outcome of an algorithm or process;
   analyzing the received first data set to infer at least one trait of the plurality of individuals, wherein the analyzing the received first data set is performed in a secure computing environment computing environment configured to operate for a discrete amount of time after the secure computing environment receives the first data set from the user such that the at least one item of PII is disposed after the discrete amount of time, wherein analyzing the received first data set comprises augmenting the first data set with a synthetic data source when the received first data set is insufficient to represent a performance of the algorithm or process;
   storing a second data set in a data store, wherein the second data set includes the at least one trait, and wherein the second data set does not include the at least one item of PII;
   analyzing the second data set to determine a fairness of the algorithm or process; and
   providing a report to the user related to the determined fairness of the algorithm or process, and wherein the providing the report includes providing the report only if it is determined that providing the report in the custom report format would not permit the user to tie the at least one trait to at least one individual of the plurality of individuals.

2. The computer-implemented method of claim 1, wherein the at least one trait includes a protected class status.

3. The computer-implemented method of claim 1, further comprising:
   receiving, from the user, a selection of a trait to infer, and wherein the analyzing the received first data set includes inferring the selected trait.

4. The computer-implemented method of claim 1, further comprising:
   receiving, from the user, a selection of a fairness test to perform, and wherein the analyzing the second data set includes performing the selected fairness test.

5. The computer-implemented method of claim 1, further comprising:
   sanitizing the first data set to remove the at least one item of PII.

6. The computer-implemented method of claim 1, further comprising:
   generating the second data set by replacing the at least one item of PII with an anonymous identifier.

7. A computer-implemented method for processing data, comprising:
   receiving, from a user, a first data set including at least one item of personally identifiable information ("PII") for a plurality of individuals, wherein the first data set includes information related to an outcome of an algorithm or process;
   analyzing the received first data set to infer at least one trait of the plurality of individuals, wherein the analyzing the received first data set is performed in a secure computing environment configured to operate for a discrete amount of time after the secure computing environment receives the first data set from the user such that the at least one item of PII is disposed after the discrete amount of time;
   creating a second data set by removing the at least one item of PII and inserting a code reflecting the at least one trait;
   storing the second data set in a data store, wherein the second data set includes the at least one trait, and wherein the second data set does not include the at least one item of PII, and wherein the data store is inaccessible by the user;
   receiving, from the user, a definition of a report format;
   determining that providing a report in the report format would enable the user to tie the at least one trait to at least one individual of the plurality of individuals; and
   providing an error message to the user in response to the determining that providing the report in the report format would enable the user to tie the at least one trait to at least one individual of the plurality of individuals.

8. The computer-implemented method of claim 7, wherein personnel of an entity operating the data store are prevented from accessing the secure computing environment.

9. The computer-implemented method of claim 7, further comprising:
using the inferred at least on trait, generating the report; and
providing the report to the user, wherein the report is configured so as to prevent the user from associating the at least one inferred trait with any one of the plurality of individuals.

10. The computer-implemented method of claim 7, further comprising:
receiving, from the user, a selection of a trait to infer,
wherein the analyzing the received first data set includes inferring the selected trait, and
wherein the selected trait includes at least one of race, gender, age, sexual orientation, citizenship status, ethnicity, financial information, or familial status.

11. A computer system for processing data, the computer system comprising:
a portal configured to receive a first data set from a user computing device, wherein the first data set includes at least one item of personally identifiable information ("PII") for one or more individuals and information related to an outcome of an algorithm or process and wherein the portal is further configured to receive a selection of at least one trait to infer;
a server configured to analyze the first data set in a secure computing environment to infer the at least one trait of the one or more individuals, wherein the server is configured to analyze the first data set to infer the at least one selected trait, wherein the server operates for a discrete amount of time after the portal receives a request from another computing device such that the server disposes of the at least one item of PII after the discrete amount of time;
a data store that is outside of the secure computing enrironment and is configured to receive a second data set including the at least one trait, and wherein the second data set does not include the at least one item of PII, wherein the user computing device and personnel of an entity operating the data store are prevented from accessing the server, including the secure computing environment;
a fairness test module that generates a report using a user selected report format and determine that providing the report in the selected report format would enable the user to tie the at least one trait to the one or more individuals; and
generate an error message in response to the determining that providing the report in the user selected report format would enable the user to tie the at least one trait to the one or more individuals.

12. The computer system of claim 11, wherein the at least one trait includes at least one of race, gender, age, sexual orientation, citizenship status, ethnicity, financial information, or familial status.

13. The computer system of claim 11, wherein the server is configured to augment the first data set with a synthetic data source in the secure computing environment, wherein the synthetic data provides a data set that is representative of a geographic area in which the algorithm or process has not been implemented.

14. The computer-implemented method of claim 1, wherein the at least one item of PII includes an address, further comprising:
using the address, determining a geographic identifier associated with the address; and
receiving, from the user, a definition of a schema of the received first data set and a selection of a trait to infer;
wherein the analyzing the received first data set includes using the schema and inferring the selected trait based at least in part on the geographic identifier.

15. The computer-implemented method of claim 14, further comprising:
providing, to the user, a graphic user interface (GUI), wherein the GUI enables the user to select the trait to infer, to define the schema of the first received data, and to define the custom report format.

* * * * *